UNITED STATES PATENT OFFICE.

MORDUCH L. KAPLAN, OF BROOKLYN, NEW YORK, ASSIGNOR TO BEACON MINIATURE ELECTRIC CO., INC., OF NEW YORK, N. Y., A CORPORATION OF NEW YORK.

GALVANIC CELL.

1,221,061. Specification of Letters Patent. Patented Apr. 3, 1917.

No Drawing. Application filed June 1, 1914. Serial No. 842,022.

*To all whom it may concern:*

Be it known that I, MORDUCH L. KAPLAN, a citizen of the United States, and a resident of Brooklyn, in the county of Kings and State of New York, have invented certain new and useful Improvements in Galvanic Cells, of which the following is a specification.

This invention relates to galvanic cells of the Leclanché type consisting of a negative zinc electrode, a positive carbon electrode, an electrolyte containing ammonium chlorid or other ammonium salts and the like, and depolarizing material comprising some form of conducting carbon incorporated with hydrate of manganese of novel qualities and high efficiency as a depolarizing agent; and the invention relates in particular to a galvanic cell comprising a new hydrate of manganese possessing an unusually high content of active oxygen.

It is customary to make use of manganese peroxid as a depolarizing agent in cells of the Leclanché type, the natural peroxid such as pyrolusite commonly being used for the purpose, although an artificial form of the dioxid or peroxid containing water of hydration has been employed to some extent. The hydrated compounds used so far as I can determine, have been of a haphazard or nondescript character lacking definite or well-defined chemical composition. In consequence such variation in the degree of hydration has led to lack of uniformity in operation, as mixed hydrates apparently have indeterminate rates of depolarization. In other words, the reaction velocity of depolarization depends on the nature of the hydrate and when a composition of an indefinite degree of hydration perhaps containing several forms of hydrated manganese material, is used the efficiency of the battery is correspondingly modified or seriously impaired. According to my invention a form of hydrate of substantially unitary composition and of a substantially uniform quality is employed and in consequence the galvanic cell derived by the use of such material possesses a degree of efficiency and longevity of a very marked character.

In organizing the galvanic cell under the present invention, I prepare a hydrate of the character specified by oxidizing a mixture of, for example, manganese hydroxid, in the presence of a solution of a manganous salt, by the action of a hot solution of potassium permanganate. For example, two equivalents of manganous hydroxid and one equivalent of manganous nitrate are treated with two equivalents of potassium permanganate yielding the hydrated oxid of manganese containing two equivalents of manganese peroxid to 1 equivalent of water. The reaction progresses according to the following equation in which equation the water of hydration has not been indicated.

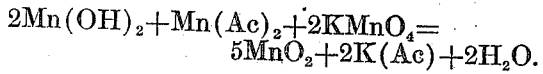

$$2Mn(OH)_2 + Mn(Ac)_2 + 2KMnO_4 = 5MnO_2 + 2K(Ac) + 2H_2O.$$

Ac=acid. The final product has the formula $MnO_2 \cdot \tfrac{2}{5}H_2O$ or $2MnO_2 \cdot H_2O$ or $(2MnO_2 \cdot H_2O)_x$, the latter formula perhaps being more correct as representing a complex molecule containing manganese dioxid and water in about the proportions designated.

The resultant product is a fine powder of dark brown or brownish color and possesses pronounced depolarizing properties.

The presence of water in about the proportion specified is responsible for the activity of the depolarizing agent and this property may be due to the union of the hydration water with the manganese peroxid to form an acid represented by the formula for $H_2Mn_2O_5$.

Prepared in this manner the depolarizing agent is incorporated with the other elements of the galvanic cell and the organization so obtained as well as the process of preparation of the depolarizing agent constitutes the present invention.

What I claim is:

1. A process of preparing a dark brown hydrate of manganese peroxid adapted for use in galvanic cells of the Leclanché type, which comprises oxidizing a mixture of manganese hydroxid and a solution of a manganous salt with a hot solution of potassium permanganate.

2. A process of preparing a hydrate of manganese peroxid adapted for use in galvanic cells of the Leclanché type, which comprises oxidizing a mixture of manganous hydroxid and a manganous salt with potassium permanganate.

3. A process of preparing a hydrate of manganese peroxid adapted for use in galvanic cells of the Leclanché type, which comprises oxidizing a mixture of manganous hydroxid and a manganous salt with a powerful compatible oxidizing agent, comprising a soluble salt of a permanganic acid.

4. A process of preparing a hydrate of manganese peroxid adapted for use in galvanic cells of the Leclanché type which comprises treating a mixture of two equivalents of manganous hydroxid and one equivalent of a manganous salt with two equivalents of potassium permanganate.

5. A process of preparing a hydrate of manganese peroxid adapted for use in galvanic cells of the Leclanché type which comprises treating two equivalents of manganese hydroxid and one equivalent of manganous salt with a hot solution containing two equivalents of potassium permanganate.

Signed at New York city, in the county of New York and State of New York, this 29th day of May, A. D. 1914.

MORDUCH L. KAPLAN.

Witnesses:
ARTHUR MARION,
CHAS. C. GILL.